US005849424A

United States Patent [19]
Sugawara et al.

[11] Patent Number: 5,849,424

[45] **Date of Patent: *Dec. 15, 1998**

[54] HARD COATED COPPER ALLOYS, PROCESS FOR PRODUCTION THEREOF AND CONNECTOR TERMINALS MADE THEREFROM

[75] Inventors: Akira Sugawara; Yoshitake Hana, both of Tokyo, Japan

[73] Assignee: Dowa Mining Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 647,812

[22] Filed: May 15, 1996

[51] Int. Cl.[6] .............................. B32B 15/20; C22F 1/08; H01R 13/05

[52] U.S. Cl. .......................... 428/674; 428/923; 428/926; 428/675; 148/536; 148/537; 148/538; 439/886; 439/887

[58] Field of Search .................................... 428/544, 547, 428/615, 618, 637, 643, 644, 646, 647, 648, 668, 671, 674, 675, 332, 923, 926; 439/524, 886, 887; 148/537, 536

[56] References Cited

U.S. PATENT DOCUMENTS

| | | | |
|---|---|---|---|
| 3,892,637 | 7/1975 | Polti | 204/37 T |
| 3,978,803 | 9/1976 | Asano et al. | 113/120 A |
| 3,982,314 | 9/1976 | Ariga et al. | 29/527.4 |
| 4,279,967 | 7/1981 | Sawada et al. | 428/647 |
| 4,441,118 | 4/1984 | Fister et al. | 357/70 |
| 4,549,043 | 10/1985 | Kalubowila et al. | 174/133 R |
| 4,830,933 | 5/1989 | Hodes et al. | 428/646 |
| 5,075,176 | 12/1991 | Brinkmann | 428/647 |
| 5,256,494 | 10/1993 | Tanaka et al. | 428/552 |
| 5,445,896 | 8/1995 | Tanaka et al. | 428/647 |
| 5,614,328 | 3/1997 | Suzuki et al. | 428/647 |

FOREIGN PATENT DOCUMENTS

| | | |
|---|---|---|
| 50-20017 | 7/1975 | Japan . |
| 61-16430 | 4/1986 | Japan . |
| 61-91394 | 5/1986 | Japan . |
| 61-231195 | 10/1986 | Japan . |
| 4-154942 | 5/1992 | Japan . |

OTHER PUBLICATIONS

P.J. Kay et al., Barrier Layers Against Diffusion in Transactions of Institute of Metal Finishing, 1979 (no month) vol. 57, pp. 169–174.

*Primary Examiner*—John J. Zimmerman
*Assistant Examiner*—Michael LaVilla
*Attorney, Agent, or Firm*—Frishauf, Holtz, Goodman, Langer & Chick, P.C.

[57] ABSTRACT

A coated Cu alloy having a high hardness surface which contains intermetallic compounds consisting essentially of Cu and Sn is produced by coating the surface of a Cu alloy with Sn and heat treating the coated Cu alloy to form on the surface thereof a high hardness coating containing Cu—Sn intermetallic compound(s). The coated Cu alloy has improved resistance to abrasion and corrosion and good workability, which permits producing terminal connectors therefrom. The Cu alloy which is coated with Sn consists essentially of 0.01–15 wt % Ni, 0.1–10 wt % Sn, 0.005–0.5 wt % P, and optionally 0.01–40 wt % in total of one or two or more elements selected from the group consisting of Fe, Co, Zn, Ti, Mg, Zr, Ca, Si, Mn, Cd, Al, Pb, Be, Te, In, Ag, B, Y, La, Cr, Ce and Au, with the balance being Cu and incidental impurities.

25 Claims, 2 Drawing Sheets

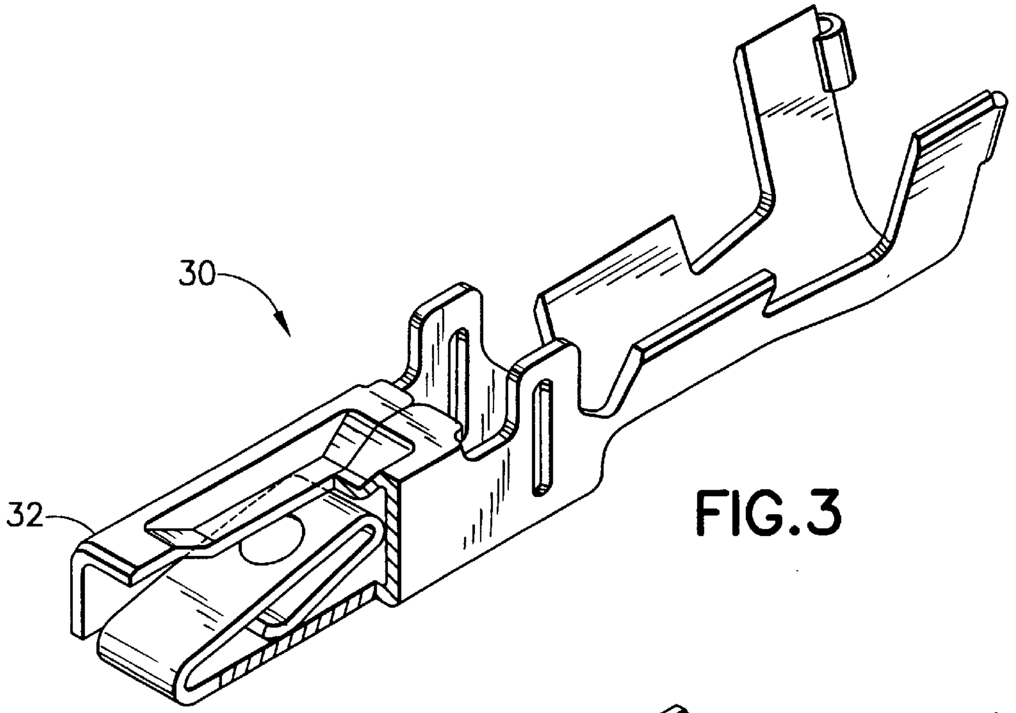
FIG.3
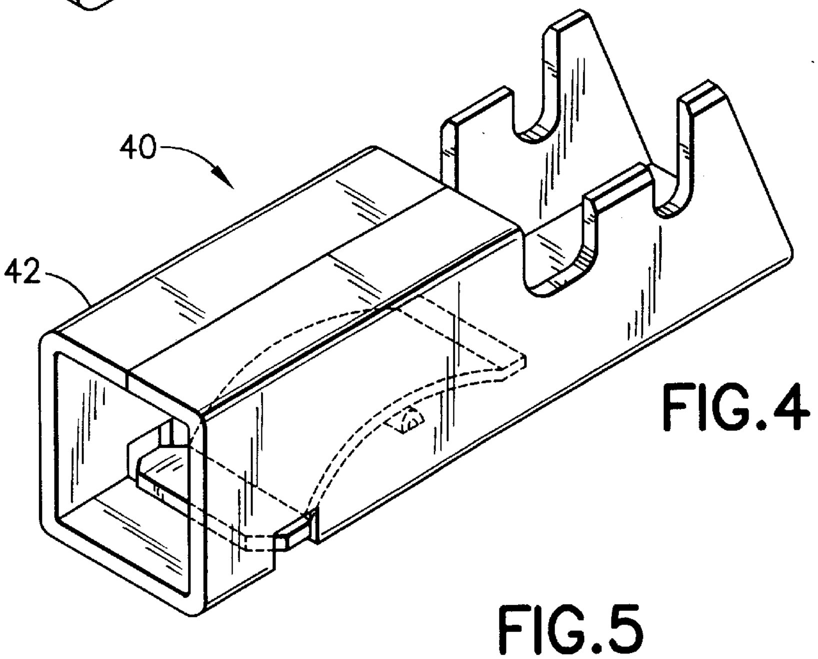
FIG.4
FIG.5
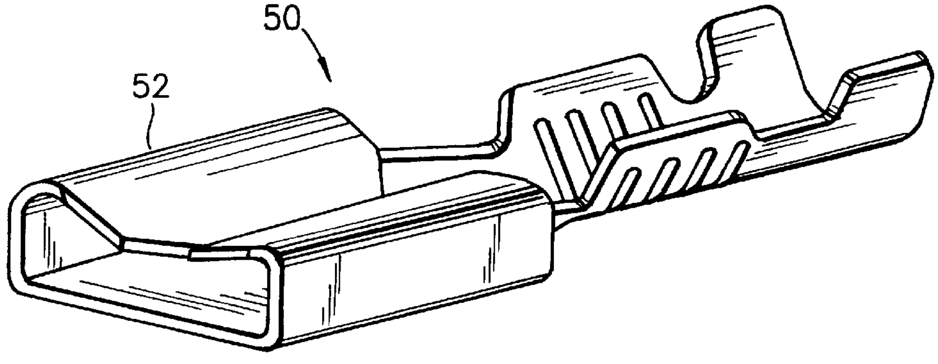

HARD COATED COPPER ALLOYS, PROCESS FOR PRODUCTION THEREOF AND CONNECTOR TERMINALS MADE THEREFROM

BACKGROUND OF THE INVENTION

This invention relates to copper alloys and a process for the production thereof. The term "copper alloys" herein used includes in the strict sense both copper and copper alloys. However, either one of them will simply be referred to as this term hereunder. In particular, the invention relates to copper alloys that can provide surfaces having improved characteristics, such as, a surface exhibiting decreased friction during insertion and drawing, for example, a surface of a multi-pin connector used for electric wiring in an automobile production; a surface of a charging-socket of an electric automobile which is used repeatedly a great number of times in insertion and drawing; a surface of a brush used in contact with a rotating body such as an electric motor and therefore is required to be highly resistant to abrasion; and a surface of a battery terminal which is also required to be highly resistant to abrasion and corrosion. The invention also relates to a process for the production of copper alloys referred to above.

With the recent development of the electronics industry, electric wiring in various machines is becoming more and more complicated and highly integrated, and this has caused use of connectors having an increased number of pins. Conventional connectors having Sn-plated surfaces have encountered a problem in that the practical use thereof is becoming more and more difficult because of the increased friction at the times of insertion and drawing.

Currently available electric automobiles require charging at least once a day. Thus, it is necessary that a charging-socket is highly resistant to abrasion. In addition, since a large amount of electric current such as 10A or more flows in sockets and therefore a large amount of heat is generated, a new problem that Sn-plated surfaces of sockets obtained by a conventional method cannot withstand the delamination of the plated surface has occurred.

A deeper understanding has been acquired with respect to the fact that the above-stated problems cannot be solved by conventional surface treatment methods. A method of the kind of the present invention was also among the conventional methods, which comprises the steps of applying heat treatment to a copper alloy and subsequently causing heat diffusion in the alloy. However, the conventional method was no more than the method for only preventing the separation or peeling off, due to the influence of working or heat, of the surface treated layer from the alloy body by making use of the diffusion between the surface treated layer and the matrix. For this reason, the stated problems could not be solved by said prior art method.

THE INVENTION

The present invention has been accomplished to solve the above-mentioned problems, and provides a copper alloy (sometimes referred to as a "copper-base" alloy) and a process for the production thereof. The process of the invention comprises the steps of coating the surface of a copper-base alloy material with Sn or an Sn-alloy coating followed by applying heat treatment to the coated surface, thereby forming in the surface treated layer on said material a very hard coating containing Cu—Sn system intermetallic compounds. By doing this, the present invention provides a copper-base alloy having a surface which is suitable when used as a connector or as a charging-socket of an electric automobile because of its having a low coefficient of friction and superiority in resistance to abrasion.

The present invention has been accomplished based on the findings that the surface hardness can be increased greatly by having a specified thickness of an Sn layer coated on a copper-base alloy having a specified composition and also utilizing specified heat treating conditions. This enables formation of Cu—Sn system intermetallic compounds, which was impossible by the conventional methods; thus the invention provides a copper-base alloy suitable for making connectors of an automobile and charging-sockets of an electric automobile.

The invention provides a copper-base alloy having on the surface thereof a high-hardness coating consisting essentially of Cu and Sn.

The invention also provides a copper-base alloy having a composition consisting essentially of 0.1–15 wt % Ni, 0.1–10 wt % Sn, and 0.005–0.5 wt % P, with the balance being Cu and incidental impurities and having on the surface thereof a high hardness coating layer consisting essentially of Cu and Sn.

The invention further provides a copper-base alloy consisting essentially of 0.1–15 wt % Ni, 0.1–10 wt % Sn, 0.005–0.5 wt e% P, and 0.01–40 wt % in total of an additional one or two or more elements selected from the group consisting of Fe, Co, Zn, Ti, Mg, Zr, Ca, Si, Mn, Cd, Al, Pb, Be, Te, In, Ag, B, Y, La, Cr, Ce and Au, with the balance being Cu and incidental impurities, and having on the surface thereof a high hardness coating consisting essentially of Cu and Sn.

The invention further provides a process for the production of a copper-base alloy comprising the steps of coating the outer surface of a copper-base alloy material with Sn, and subjecting the coated material to a heat treatment in order to form on the surface of the material a high hardness coating consisting essentially of Cu and Sn.

The invention further provides a process for the production of a copper-base alloy comprising the steps of coating with Sn the surface of a copper-base alloy consisting essentially of 0.1–15 wt % Ni, 0.1–10 wt % Sn, 0.005–0.5 wt % P, with the balance being Cu and incidental impurities, followed by heat treating the alloy material to form on the surface thereof a high hardness coating layer consisting essentially of Cu and Sn.

The invention further provides a process for the production of a copper-base alloy, characterized by comprising the steps of coating with Sn the surface of a copper-base alloy material consisting essentially of 0.1–15 wt % Ni, 0.1–10 wt % Sn, 0.005–0.5 wt % P, and 0.01–40 wt % in total of additional one or two or more components selected from the group consisting of Fe, Co, Zn, Ti, Mg, Zr, Ca, Si, Mn, Cd, Al, Pb, Be, Te, In, Ag, B, Y, La, Cr, Ce and Au, with the balance being Cu and incidental impurities, followed by heat treating the coated material to form on the surface thereof a high hardness coating consisting essentially of Cu and Sn.

In the processes of the invention, the thickness of the Sn coating should be in the range of 0.5–20 $\mu$m, preferably in the range of 1–10 $\mu$m, and the most preferably in the range of 1–5 $\mu$m. The heat treatment after the coating should be effected preferably at a temperature in the range of 100°–600° C. for a period of time in the range of 0.5–24 hours, more preferably at a temperature in the range of 200°–500° C. for a period of time in the range of 0.5–24 hours, and the most preferably at a temperature in the range of 250°–500° C. for a period of time in the range of 3–10 hours. Said heat treatment can also be effected stepwise at two or more different temperatures, so long as each treating temperature is within the specified range and total treating time is within the specified period of time.

The high hardness coating consisting essentially of Cu and Sn has a Vickers (Hv) of at least 300 and preferably of more than 450. Said high hardness coating contains intermetallic compounds of Cu and Sn as discussed in more detail hereinafter.

The present invention also provides electrical connector terminals made from the coated Cu alloy of the present invention.

BRIEF DESCRIPTION OF THE DRAWINGS

FIG. 3 is a perspective view of a typical female connector terminal fabricated from the coated Cu alloy of the present invention, and which is usable with either of the male connector terminals of FIGS. 1 and 2;

FIG. 4 is a perspective view of a typical female connector terminal fabricated from the coated Cu alloy of the present invention, and which is usable with either of the male connector terminals of FIGS. 1 and 2; and FIG. 5 is a perspective view of a typical female connector terminal fabricated from the coated Cu alloy of the present invention, and which is usable with either of the male connector terminals of FIGS. 1 and 2.

DETAILED DESCRIPTION OF THE DRAWINGS

Figure 1:
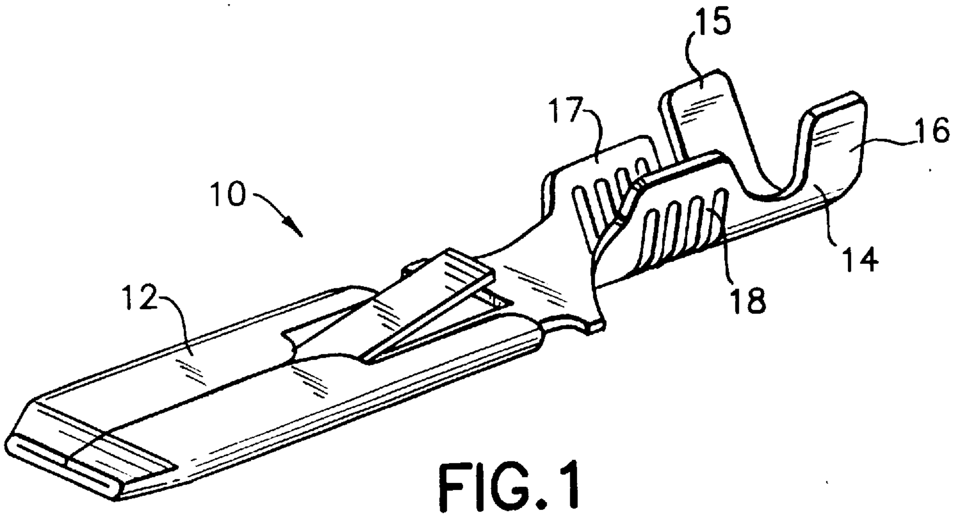
FIG. 1 is a perspective view of a male connector terminal fabricated from the coated Cu alloy of the present invention.
Figure 2:
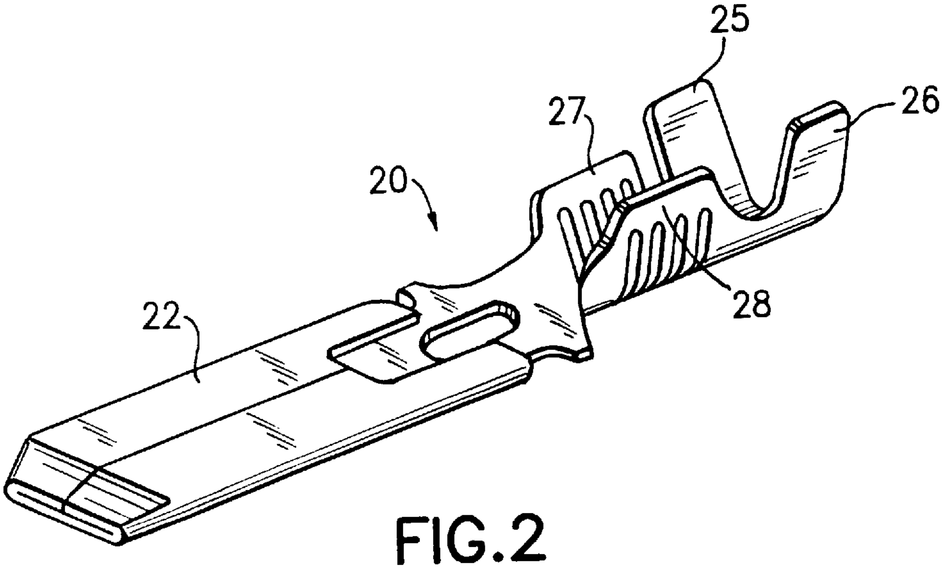
FIG. 2 is a perspective view of another male connector terminal fabricated from the coated Cu alloy of the present invention.

FIGS. 1–5 are perspective views showing male and female connector terminals which can be made from the coated Cu alloy of the present invention. In FIG. 1, the connector terminal 10 comprises a male or spade portion 12 and a wire receiving portion 14. The wire receiving portion 14 has bent-up portions 15–18, which are bent over a wire inserted therein to clamp the wire to the connector terminal. The male connector terminal 20 of FIG. 2 similarly includes a spade portion 22 and bent-up portions 25–28 which, after receiving a wire, are bent over to clamp the wire in place. In both the terminals of FIGS. 1 and 2, an electrical connection is made to the bent-over portions 17–18 and 27–28, respectively, which are bent over the conductor portions of the wires.

FIGS. 3–5 show typical female connectors 30, 40, 50, respectively, which have U-shaped portions which are bent over after a wire is inserted therein to make electrical contact to the wire and to clamp the wire in position relative to the terminal. Each of the terminals 30, 40, 50 have female portions 32, 42, 52, respectively, which receive the male spade portions 12, 22 of the male connectors of, for examples, FIGS. 1 and/or 2.

The male and female connectors of FIGS. 1–5 have various bent portions which require good bendability of the material from which the connectors are made, and have portions which make slidable contact, thereby requiring a high degree of surface hardness and a high degree of electrical conductivity, while also having a relatively low coefficient of friction and superior resistance to abrasion, which are properties of the coated Cu alloy of the present invention. As should be readily apparent, male and/or female connector terminals, or other types of terminals, could also be made with the alloy of the present invention.

DETAILED DESCRIPTION OF THE INVENTION

We now describe the reason why the selected elements are to be added to copper-base alloys according to the present invention and the criticality of the compositional ranges of these alloys. (1) Nickel (Ni) dissolves in the Cu matrix and contributes to an improvement in strength, elasticity and resistance to heat and stress relaxation and resistance to migration. Ni forms compounds with P, which are dispersed and precipitated to provide better electrical conductivity. By applying a heat treatment after the surface coating, the formation of Cu—Sn system diffusion layer can effectively be performed. In addition, part of the added Ni diffuses into the side of the surface-treated layer to form in the interfacial or diffusion layer intermetallic compounds such as Ni—Sn, Cu—Ni—Sn, etc., to provide improvements in strength, hardness, adhesion and corrosion resistance, etc.

If the Ni content is less than 0.1 wt %, the above-mentioned effects will not be achieved; if the Ni content exceeds 15 wt %, there occurs a marked drop in electrical conductivity and economic disadvantages will also occur. The Ni content is preferably between 0.5 and 3 wt %.

(2) Tin (Sn) dissolves in the Cu matrix to provide improved strength, elasticity and corrosion resistance. However, if the Sn content is less than 0.1 wt %, the improvement in strength and elasticity will not be fully achieved; if the Sn content exceeds 10 wt %, there occurs a marked drop in electrical conductivity, instability and hot workability. The Sn content is preferably between 0.5 and 2 wt %.

(3) Phosphorus (P) forms compounds with Ni, which are dispersed and precipitated to provide better electrical conductivity, strength and anti-stress relaxation characteristics. However, if the P content is less than 0.005 wt %, the stated effects are not fully achieved; if the P content exceeds 0.5 wt %, there occurs a marked drop in electrical conductivity, workability and solder's weather resisting characteristics, even in the presence of Ni, and also the migration resistance decreases. The P content is preferably between 0.005 wt % and 0.2 wt %.

(4) The ratio of weight percentages of Ni to P (Ni/P)

In the copper base alloys according to the present invention, part of Ni and part of P, both added thereto, form a Ni—P system compound in the form of uniformly dispersed fine precipitates. The formation of these precipitates contributes to the improvement of strength, elasticity, resistance to stress relaxation, as well as electric conductivity. It is preferred that the ratio of weight percentages of Ni to P (Ni/P) is between 5:1 to 50:1, which is often referred to as a ratio of "5" and "50", respectively. The Ni/P ratio is preferably between 10 and 35 and is more preferably about 20.

(5) Auxiliary components

The addition as auxiliary component or components of one or two or more elements selected from the group consisting of Fe, Co, Zn, Ti, Mg, Zr, Ca, Si, Mn, Cd, Al, Pb, Be, Te, In, Ag, B, Y, La, Cr, Ce and Au in an amount of 0.01–40 wt % contributes to further improvement in the stated characteristics.

Zinc (Zn) has not only the ability to further improve the weather fastness of the plated surface of the copper-base alloy, but also the other advantages inclusive of the weight reduction of the alloy due to its low specific weight, and the economical merit due to its inexpensiveness. However, if the Zn content exceeds 40 wt % there occurs the reduction in the resistance to stress corrosion crack and electrical conductivity. The Zn content is between 0.01 and 40 wt % preferably 0.05–5 wt % and more preferably 0.1–2 wt %.

As regards the other elements inclusive of Fe, Co, Ti, Mg, Zr, Ca, Si, Mn, Cd, Al, Pb, Be, Te, In, Ag, B, Y, La, Cr, Ce and Au, the incorporation of these elements improves the characteristics of the alloys such as strength and elasticity; these auxiliary components are also effective in improving strength, elasticity and workability of the copper-base alloys of the present invention without decreasing the electrical conductivity of the copper-base alloys.

The contents of these auxiliary components should be in the ranges given below for the reasons of assuring good electrical conductivity, good shaping workability or realizing easy producibility.

| | | |
|---|---|---|
| Fe; 0.01–5 wt %; | Co: 0.01–5 wt %; | Ti: 0.01–5 wt %; |
| Mg: 0.01–3 wt %; | Zr: 0.01–3 wt %; | Ca: 0.01–1 wt %; |
| Si: 0.01–3 wt %; | Mn: 0.01–10 wt %; | Cd: 0.01–5 wt %; |
| Al: 0.01–10 wt %; | Pb: 0.01–5 wt %; | Be: 0.01–3 wt %; |
| Te: 0.01–5 wt %; | In: 0.01–5 wt %; | Ag: 0.01–5 wt %; |
| B: 0.01–1 wt %; | Y: 0.01–5 wt %; | La: 0.01–5 wt %; |
| Cr: 0.01–5 wt %; | Ce: 0.01–5 wt %; | Au: 0.01–5 wt %. |

A preferred range for each of the auxiliary elements follows:

| | | |
|---|---|---|
| Fe: 0.1–2 wt %, | Mg: 0.1–1 wt %, | Si: 0.1–1 wt %, |
| Al: 0.1–2 wt %, | Te: 0.01–1 wt %, | B: 0.01–0.2 wt %, |
| Cr: 0.1–1 wt %, | Co: 0.1–2 wt %, | Zr: 0.01–1 wt %, |
| Mn: 0.1–2 wt %, | Pb: 0.01–1 wt %, | In: 0.01–1 wt %, |
| Y: 0.01–0.5 wt %, | Ce: 0.01–1 wt %, | Ti: 0.1–2 wt %, |
| Ca: 0.1–0.5 wt %, | Cd: 0.01–1 wt %, | Be: 0.01–2 wt %, |
| Ag: 0.01–2 wt %, | La: 0.01–0.5 wt %, | Au: 0.1–1 wt %. |

Typical examples of the alloys include the Cu—Ni—Sn—P system and Cu—Ni—Sn—P (with one or two or more of Fe, Co, Zn, Ti and Mg) system.

(6) It is necessary that Cu constitutes at least 55 wt % of the copper-base alloys from a viewpoint of enabling effective formation of Cu—Sn system intermetallic compound ($Cu_3Sn$, $Cu_4Sn$, etc.) in the resulting alloys. Preferably, the Cu content is at least 90; more preferably at least 94; and particularly at least 95 wt %.

The copper-base alloys prepared in accordance with the present invention are superior in heat resisting characteristics and so it can fully withstand heat diffusion that occurs after the surface coating; thus, there is provided an effective formation of Cu—Sn system intermetallic compound due to heat diffusion. The thickness of Sn coating and the reason for restricting the conditions for diffusion treatment will be explained below.

(7) Thickness of Sn coating

If the thickness of Sn coating is less than 0.5 $\mu$m, corrosion resistance of the alloy is easy to decrease. Particularly, corrosion due to gaseous $H_2S$ may sometimes become a serious problem. In addition, since the thickness of the layer of intermetallic compound becomes thin, there is a fear that some of the physical properties will be deteriorated. If the thickness of Sn coating exceeds 20 $\mu$m, the diffusion layer will become too thick to prevent cracking during the step of working. As is represented by the stated trouble, the decrease in formability and workability is observed. In addition, fatigue characteristics will decrease and the problem of economical disadvantage will occur.

The thickness of Sn coating is preferably specified to range from 0.5 to 20 $\mu$m, more preferably from 1 to 10 $\mu$m, and the most preferably from 1 to 5 $\mu$m.

Various known methods such as electric plating, chemical plating, vapor deposition, hot dipping, etc., can be used to apply Sn coating layer to the alloy. In order to obtain a strongly adhered uniform coating layer most economically, however, means such as electrical plating, molten metal dipping, etc., are recognized to be the most suitable.

As regards Sn to be used for coating, it may be a Sn—Pb alloy whose Sn content is 50% or more.

(8) Conditions for heat treatment

If heat treatment is effected at a temperature less than 100° C., it will take too much time to diffuse Sn. Thus, the treatment will become disadvantageous from a viewpoint of economy. If it is effected at a temperature exceeding 600° C., copper-base alloy as a material will soften in a short time and the strength and hardness will significantly be reduced.

If treatment time under heating is less than 0.5 hour, diffusion of Sn will be insufficient and effective formation of intermetallic compound cannot be attained. If it exceeds 24 hours, the treatment will become economically disadvantageous and production efficiency will also be impaired.

Thus, heat treatment conditions should be as follows. Preferably, it should be effected at a temperature in the range of 100°–600° C. for a period of time in the range of 0.5–24 hours; more preferably it should be effected at a temperature in the range of 200°–500° C. for a period of time in the range of 0.5–24 hours; and the most preferably, it should be effected at a temperature in the range of 250°–500° C. for a period of time in the range of 3–10 hours.

For effecting heat treatment, no special atmosphere such as inert or reducing atmosphere is required. Thus, the operation is economically advantageous.

As a result of the heat treatment, Cu diffuses from the alloy body into the surface coating, to provide a coated alloy having a high hardness surface coating containing Cu—Sn intermetallic compounds, such as $Cu_3Sn$ and $Cu_4Sn$. Small amounts of one or more alloying elements from the alloy may diffuse into the coating layer. Sn diffuses inward; there should be a decreasing content of Sn from the surface inward and a gradation of Cu and other alloying elements, e.g., Ni, decreasing from the alloyed body toward the surface coating. The coated Cu alloy may be characterized as having a Cu—Sn surface coating and diffusion Cu—Sn and/or Cu—Ni—Sn diffusion layer between the coating and the body of the alloy. Taking into consideration the thinness of the surface coating, the coated Cu alloy also may be characterized as a Cu-rich alloy with a high hardness Cu and Sn containing surface coating with an intermediate diffusion layer. The coated Cu alloy also may be considered a Cu and Sn containing surface layer of high hardness with a decreasing Sn content into the alloy body and a decreasing Cu content outward from the alloy body to the surface. The surface hardness (Hv) is at least 300 and preferably above 450.

In the coated Cu alloy of the present invention, adhesion between the surface coating containing intermetallic compounds and the body is good, and the deterioration of characteristics of the material which is generally caused by annealing can be avoided. Further, since the adhesion between said surface layer and the body is improved, delamination or cracking which is often caused during the step of bending or the step of stretch forming can be avoided. Thus, the so-called "hard-workability" difficulty of clad material is substantially mitigated or avoided.

After heat treatment, the oxide film formed on the surface is preferably removed by chemical treatment such as pickling, or by mechanical treatment such as buffing. By this removal of the surface film, further improvement in the value of contact resistance and soldering characteristics can be expected. The surface film is preferably removed within the range of 0.01–0.2 μm from the outer surface level.

The invention will be explained in more detail by referring to the following examples.

EXAMPLE 1

Copper-base alloy Nos. 1–2 (invention alloys) and No. 3 (comparative alloy) that had the chemical compositions (wt %) shown in Table 1 were rolled to sheets having the thickness of 0.3 mm, followed by coating with Sn by means of electroplating effected in a sulfuric acid bath. The respective Sn plated alloys were subjected to heat treatment under the following conditions: Sn film thickness, 7.0 μm; heat treatment temperature: 350° C., treatment time: 5 hours.

TABLE 1

| Alloy | Composition (wt %) | | | | | |
|---|---|---|---|---|---|---|
| No. | Ni | Sn | P | Zn | Ni/P ratio | Cu |
| 1 | 1.07 | 0.92 | 0.050 | — | 21.4 | balance |
| 2 | 1.01 | 0.92 | 0.037 | — | 27.3 | balance |
| 3 | — | — | — | 30.49 | — | balance |

Using the samples thus prepared, the hardness, tensile strength, spring limit and electrical conductivity of each sheet were measured in accordance with JIS-Z-2244, JIS-Z-2241,and JIS-H-0505, respectively.

For evaluating the amenability to bending work, a 90° W bend test was conducted (CES-M-0002-6, R=0.2 mm, in both the rolling direction and a direction normal thereto); specimens having a satisfactory surface in the central ridge were rated ○, those in which wrinkles occurred were rated Δ, and those in which cracks occurred were rated x. As regards stretch formability, method of Erichsen cupping test was applied in accordance with JIS-Z-2247A. The results are collectively shown in Table 2.

As one can see from Table 2, copper-base alloy Nos. 1–2 within the scope of the invention were significantly improved in the surface hardness; had a good balance between tensile strength, spring limit and electrical conductivity, while exhibiting high amenability to bending work as well as having good stretch formability.

Therefore, those alloys have very good characteristics which make them suitable for use as materials to make connectors, sockets for charging and the like uses. Typical connectors for which the coated Cu alloy of the present invention are useful are shown in FIGS. 1–5. In contrast, alloy No. 3 (comparison) outside the scope of the present invention was found to have significantly decreased hardness and tensile strength as a result of being softened during the step of heat treatment.

TABLE 2

| Alloy No. | Before or After Heat Treatment | Surface Hardness (Hv) | Parent Metal Hardness (Cross Section) (Hv) | Tensile Strength ($N/mm^2$) | Spring Limit ($N/mm^2$) | Electrical Conductivity (% IACS) | 90° W Bend | Erichsen value A(mm) |
|---|---|---|---|---|---|---|---|---|
| 1 | Before | 163 | 174 | 527 | 440 | 39.0 | ○ | 5.5 |
| | After | 510 | 180 | 504 | 442 | 38.6 | Δ | 4.9 |
| 2 | Before | 153 | 166 | 490 | 392 | 45.2 | ○ | 5.2 |
| | After | 535 | 172 | 463 | 402 | 45.0 | Δ | 5.1 |
| 3 | Before | 160 | 165 | 513 | 255 | 26.9 | ○ | 7.8 |
| | After | 485 | 145 | 370 | 242 | 27.1 | Δ | 9.8 |

EXAMPLE 2

Alloy No. 1 was subjected to testing of hardness, tensile strength, spring limit, electrical conductivity, amenability to bending work and stretch formability in the same manner as in Example 1 under the conditions where the thickness of plating and heat treating temperature were changed. The results are shown in Table 3.

TABLE 3

| Alloy No. | Treatment Temperature (°C.) | Plated Film Thickness (μm) | Surface Hardness (Hv) | Parent Metal Hardness (Hv) | Tensile Strength ($N/mm^2$) | Spring Limit ($N/mm^2$) | Electrical Conductivity (% IACS) | 90° W Bend | Erichsen value A(min) |
|---|---|---|---|---|---|---|---|---|---|
| 1 | 700 | 7.0 | 520 | 85 | 330 | — | 40.1 | × | 8.7 |
| | | 3.5 | 460 | 180 | 511 | 474 | 39.5 | Δ | 5.4 |
| | 350 | 7.0 | 510 | 180 | 504 | 442 | 38.6 | Δ | 4.9 |
| | | 22 | 506 | 180 | 502 | 444 | 38.1 | × | 4.1 |
| | 250 | 3.5 | 325 | 185 | 522 | 484 | 38.7 | Δ | 5.3 |
| | | 7.0 | 320 | 182 | 515 | 434 | 37.2 | Δ | 5.3 |
| 1 | Before Treatment | — | 163 | 174 | 527 | 440 | 39.0 | ○ | 5.5 |

As is obvious from the data shown in Table 3, by conducting heat treatment after surface treatment the surface hardness of the alloy is highly enhanced. For example, in the cases when plated layer thickness was 3.5 μm or 7.0 μm and heat treatment was conducted at a temperature of 250° C. or 350° C., improvements in the surface hardness, parent material hardness and spring limit were observed.

EXAMPLE 3

Alloy No. 1 was surface coated and heat treated as reported in Table 4, which also reports the test data for the product.

TABLE 4

| | |
|---|---|
| Temperature of heat treatment (°C.) | 350 |
| Plated coat film thickness (μm) | 1.2 |
| Surface hardness (Hv) | 480 |
| Parent metal hardness (Hv) | 180 |
| δB | 518 |
| Kb | 491 |
| % IACS | 39.1 |
| 90° W bend | |
| Erichsen | 5.8 |

EXAMPLE I

Table 5 reports (i) the alloy composition and surface thickness and characteristics, (ii) the heat treating temperature, and (iii) the product characteristics for each of Alloy Nos. 4, 5, 6 and 7.

TABLE 5

| Alloy No. | No. 4 | No. 5 | No. 6 | No. 7 |
|---|---|---|---|---|
| Ni (wt %) | 1.40 | 1.1 | 0.88 | 1.31 |
| Sn (wt %) | 0.83 | 1.3 | 0.91 | 0.77 |
| P (wt %) | 0.063 | 0.055 | 0.061 | 0.054 |
| Auxiliary elements | 0.6 Zn | 0.18 Ti<br>0.19 Si | 0.15 Mg<br>0.31 Al | 0.51 Co<br>0.11 Zn<br>0.18 Cr |
| Ni/P | 22 | 20 | 14 | 24 |
| Temperature of heat treatment (°C.) | 300 | 380 | 350 | 300 |
| Plated coat film thickess (μm) | 2.1 | 1.0 | 3.5 | 3.0 |
| Surface hardness (Hv) | 460 | 470 | 510 | 490 |
| Parent metal hardness (Hv) | 175 | 191 | 180 | 180 |
| σB | 521 | 552 | 518 | 520 |
| Kb | 459 | 490 | 446 | 449 |
| % IACS | 35.9 | 33.7 | 38.5 | 40.8 |
| 90° W bend | Δ | Δ | Δ | Δ |
| Erichsen | 6.1 | 6.2 | 5.5 | 5.8 |

If the requisites of the present invention are not satisfied, however, it will not be possible to develop the preferred characteristics of both the surface of the material and the body of the material at the same time. For example, if plating is given in thickness of 7 mm and heat treatment is conducted at a temperature of 700° C., softening occurs during the step of heat treatment and as a result, hardness and tensile strength of the parent material, spring limit, amenability to bending work will be significantly deteriorated. Alternatively, if plating is given into a thickness of 22 μm, and heat treatment is conducted at 350° C., amenability to bending work will be significantly impaired.

Therefore, copper-base alloys of the present invention that fulfill the stated requisites have various superior characteristics which make the alloys suitable for use in connectors, charging sockets, etc.

As is obvious from the stated examples, the copper-base alloys of the present invention have high strength, high elasticity and high electrical conductivity as well as having superior amenability to bending work, and superior stretch formability and therefore are suitable for use such as connectors, charging-sockets, etc. That is, they are the copper-base alloys having high strength, high elasticity and high electrical conductivity, and therefore suitable for uses such as connectors, and charging sockets. Namely, they can provide materials for making connectors properly matching recent trend of high densification of electrical equipments of automobiles, and fully matching charge of a large electric current in electric automobiles. In addition, since the copper-base alloys produced by the method of the present invention have improved characteristics such as high resistance to abrasion and corrosion, they can be used as a variety of electronic parts or construction materials by making the best use of said improved characteristics.

What is claimed is:

1. A coated Cu alloy comprising a Cu alloy having a surface coating formed directly on an outer surface of said Cu alloy, said surface coating having a thickness of 0.5 to 20 μm, said surface coating containing an intermetallic compound consisting essentially of Cu and Sn, said surface coating having a Hv hardness of above 300; and said Cu alloy consisting essentially of 0.1–15 wt % Ni, 0.1–10 wt % Sn and 0.005–0.5 wt % P, with the remainder being Cu.

2. A coated Cu alloy of claim 1 wherein said surface coating has an Hv hardness of above 450 and a thickness of between 1 and 10 μm, said Cu alloy consists essentially of 0.5–3 wt % Ni, 0.5–2 wt % Sn, 0.005–0.2 wt % P and a Ni/P ratio of between 5 and 50 and containing at least 94 wt % Cu.

3. A coated Cu alloy of claim 2 wherein said surface coating has a thickness of between 1 and 5 μm, and said Cu alloy has a Ni/P ratio of between about 10 and 35 and contains at least 97 wt % Cu.

4. A coated copper alloy of claim 3 wherein said Cu alloy contains about 0.9 wt % Sn, about 1 wt % Ni and about 0.03–0.06 wt % P.

5. A coated Cu alloy comprising a Cu alloy having a surface coating formed directly on an outer surface of said Cu alloy, said surface coating having a thickness of 0.5 to 20 μm, said surface coating containing an intermetallic compound consisting essentially of Cu and Sn, said surface coating having an Hv hardness of above 450 and a thickness of between 1 and 10 μm; and said Cu alloy consisting essentially of 0.1–15 wt % Ni, 0.1–10 wt % Sn, 0.005–0.5 wt % P, and 0.01–40 wt % of a total of at least one auxiliary element selected from the group consisting of Fe, Co, Zn, Ti, Mg, Zr, Ca, Si, Mn, Cd, Al, Pb, Be, Te, In, Ag, B, Y, La, Cr, Ce and Au, with the remainder of the alloy being copper, wherein each of said at least one auxiliary element is in the following amount:

| | | |
|---|---|---|
| Zn: 0.01–40 wt %; | Co: 0.01–5 wt %; | Ti: 0.01–5 wt %; |
| Fe: 0.01–5 wt %; | Zr: 0.01–3 wt %; | Ca: 0.01–1 wt %; |
| Mg: 0.01–3 wt %; | Mn: 0.01–10 wt %; | Cd: 0.01–5 wt %; |
| Si: 0.01–3 wt %; | Pb: 0.01–5 wt %; | Be: 0.01–3 wt %; |
| Al: 0.01–10 wt %; | In: 0.01–5 wt %; | Ag: 0.01–5 wt %; |
| Te: 0.01–5 wt %; | Y: 0.01–5 wt % | La: 0.01–5 wt %; |
| B: 0.01–1 wt%; | Ce: 0.01–5 wt %; | Au: 0.01–5 wt %. |
| Cr: 0.01–5 wt%; | | |

6. A coated Cu alloy of claim 5 wherein said surface coating has a thickness of between 1 and 5 μm, and said Cu alloy has a Ni/P ratio of between 5 and 50 and contains at least 90 wt % Cu.

7. A coated Cu alloy of claim 5 wherein said Cu alloy contains at least one auxiliary element in an amount within the range for each element set forth below

| | | |
|---|---|---|
| Zn: 0.05–5 wt %, | Mg: 0.1–1 wt %, | Si: 0.1–1 wt %, |
| Fe: 0.1–2 wt %, | Te: 0.01–1 wt %, | B: 0.01–0.2 wt %, |
| Al: 0.1–2 wt %, | Co: 0.1–2 wt %, | Zr: 0.01–1 wt %, |
| Cr: 0.1–1 wt %, | Pb: 0.01–1 wt %, | In: 0.01–1 wt %, |
| Mn: 0.1–2 wt %, | Ce: 0.01–1 wt %, | Ti: 0.1–2 wt %, |
| Y: 0.01–0.5 wt %, | Cd: 0.01–1 wt %, | Be: 0.01–2 wt %, |
| Ca: 0.1–0.5 wt %, | La: 0.01–0.5 wt %, | Au: 0.1–1 wt %. |
| Ag: 0.01–2 wt %, | | |

8. A coated Cu alloy of claim 5 wherein said at least one auxiliary element is selected from the group consisting of (i) Fe, Co, Zn, Ti, and Al in an amount between 0.1 and 2 wt % and (ii) Mg, Zr, Si and Cr in an amount of between 0.1 and 1 wt %.

9. A coated Cu alloy of claim 5 wherein said at least one auxiliary element is zinc in an amount of 0.1 to 2 wt %.

10. An electrical connector terminal made from the coated Cu alloy of claim 1.

11. An electrical connector terminal made from the coated Cu alloy of claim 2.

12. An electrical connector terminal made from the coated Cu alloy of claim 3.

13. An electrical connector terminal made from the coated Cu alloy of claim 4.

14. An electrical connector terminal made from the coated Cu alloy of claim 5.

15. An electrical connector terminal made from the coated Cu alloy of claim 6.

16. An electrical connector terminal made from the coated Cu alloy of claim 7.

17. A process for the production of a coated Cu alloy, the coated alloy comprising a Cu alloy having a surface coating formed directly on an outer surface of said Cu alloy, said surface coating having a thickness of 0.5 to 20 μm, said surface coating containing an intermetallic compound consisting essentially of Cu and Sn, said surface coating having a Hv hardness of above 300; and said Cu alloy consisting essentially of 0.1–15 wt % Ni; 0.1–10 wt % Sn and 0.005–0.5 wt % P, with the remainder being Cu, the process comprising coating a surface of a Cu alloy sheet with 0.05 to 20 μm of Sn, and heat treating the resultant Sn coated Cu alloy to form a high hardness Cu—Sn intermetallic compound coating on said surface.

18. A process for the production of a coated Cu alloy according to claim 17 wherein said Cu alloy consists essentially of 0.1–15 wt % Ni, 0.1–10 wt % Sn and 0.005–0.5 wt % P, with the balance being Cu and incidental impurities, coating said surface of said Cu alloy with between 1 and 10 μm of Sn, and heat treating the Sn coated Cu alloy at between 100° C. and 600° C. for 0.5 to 24 hours to provide a surface coating having an Hv hardness of above 300 and containing intermetallic compounds consisting essentially of Cu and Sn.

19. A process for the production of a coated Cu alloy according to claim 18 wherein the Ni/P ratio is from 5 to 50.

20. A process for the production of a coated Cu alloy according to claim 19 wherein said coated surface has a hardness of above 450 and wherein said surface of said Cu alloy is coated with between 1 and 10 μm of Sn and wherein said Sn coated Cu alloy is heat treated at a temperature of from 200° to 500° C.

21. A process for the production of a coated Cu alloy according to claim 20 wherein said tin is coated in a thickness of from 1 to 5 μm and said Sn coated Cu alloy is heat treated at 250° to 500° C. for 3 to 10 hours.

22. A process for the production of a coated Cu alloy according to claim 17 wherein said Cu alloy consists essentially of 0.1–15 wt % Ni, 0.1–10 wt % Sn and 0.005–0.5 wt % P, and 0.01–40 wt % of a total of at least one element selected from the group consisting of Fe, Co, Zn, Ti, Mg, Zr, Ca, Si, Mn, Cd, Al, Pb, Be, Te, In, Ag, B, Y, La, Cr, Ce and Au, with the balance being Cu and incidental impurities, coating said surface of said Cu alloy with between 1 and 10 μm of Sn, and heat treating the Sn coated Cu alloy at between 100° C. and 600° C. for 0.5 to 24 hours to provide a surface coating having an Hv hardness of above 300 and containing intermetallic compounds consisting essentially of Cu and Sn.

23. A process for the production of a coated Cu alloy according to claim 22, wherein the Ni/P ratio is from 5 to 50.

24. A process for the production of a coated Cu alloy according to claim 23, wherein said coated surface has a hardness of above 450 and wherein said surface of said Cu alloy is coated with between 1 and 10 μm of Sn and wherein said Sn coated Cu alloy is heat treated at a temperature of from 200° to 500° C.

25. A process for the production of a coated Cu alloy according to claim 24 wherein said tin is coated in a thickness of from 1 to 5 μm and said Sn coated Cu alloy is heat treated at 250° to 500° C. for 3 to 10 hours.

* * * * *